United States Patent [19]
Iimura

[11] Patent Number: 5,913,594
[45] Date of Patent: Jun. 22, 1999

[54] FLAT PANEL LIGHT SOURCE DEVICE AND PASSIVE DISPLAY DEVICE UTILIZING THE LIGHT SOURCE DEVICE

[76] Inventor: Keiji Iimura, 10-8, Akatsuka 3-Chome Itabashi-ku, 175 Tokyo, Japan

[21] Appl. No.: 08/805,699

[22] Filed: Feb. 25, 1997

[51] Int. Cl.$^6$ .......................... G01D 11/28; G02F 1/1335
[52] U.S. Cl. .................................. 362/31; 362/26; 349/67
[58] Field of Search ............................... 362/31, 26, 800, 362/223, 812, 27, 29; 349/67, 65

[56] References Cited

U.S. PATENT DOCUMENTS

| | | | |
|---|---|---|---|
| 2,566,458 | 9/1951 | Macau V. | 362/31 |
| 5,207,493 | 5/1993 | Murase et al. | 362/31 |
| 5,280,415 | 1/1994 | Barnette | 362/31 |
| 5,392,199 | 2/1995 | Kashima et al. | 362/31 |
| 5,410,454 | 4/1995 | Murase et al. | 362/31 |
| 5,438,453 | 8/1995 | Kuga | 359/636 |
| 5,461,547 | 10/1995 | Ciupke et al. | 362/31 |
| 5,467,208 | 11/1995 | Kokawa et al. | 359/49 |
| 5,618,096 | 4/1997 | Parker et al. | 362/31 |
| 5,729,311 | 3/1998 | Broer et al. | 362/31 |

*Primary Examiner*—Ira S. Lazarus
*Assistant Examiner*—David Lee

[57] ABSTRACT

Flat panel light source device comprises first and second light transmission panels and light coupling device. Both panels may have relatively high refractive index and relatively high light transmission characteristics. The first panel is used for illumination and the second panel is used for bypass light guide. Both panels are located adjacently in parallel. The light coupling device makes light coupling between both panels and is located near one pair of side terminals in both panels, distant from another pair of side terminals to which incident light rays are input. The second panel may have at least one of light reflective layer of light transmission material with lower refractive index than the second panel. Alternatively, the second panel may have multiple of optical fibers. A passive type display device comprises a flat panel type passive display device and the flat panel light source in described above. The liquid crystal display device may be used for the passive display device.

21 Claims, 13 Drawing Sheets

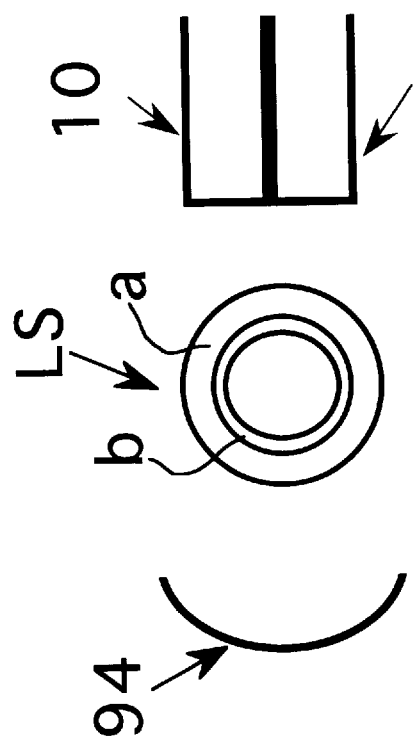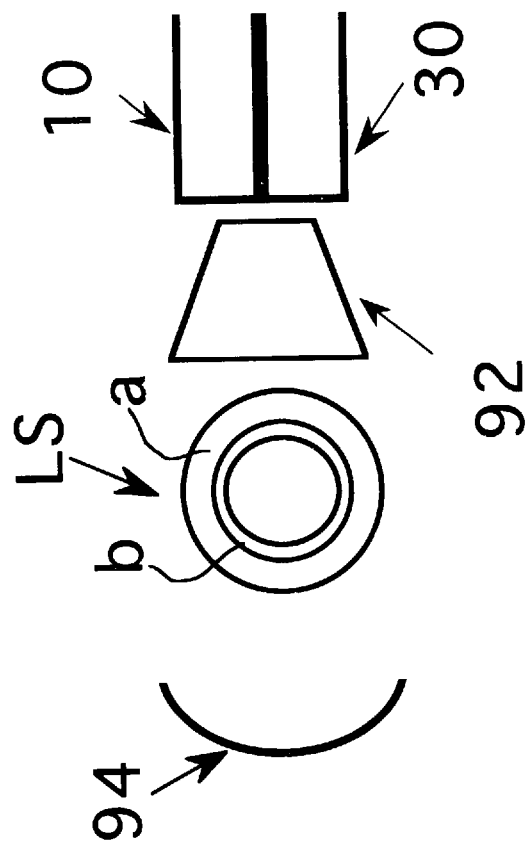

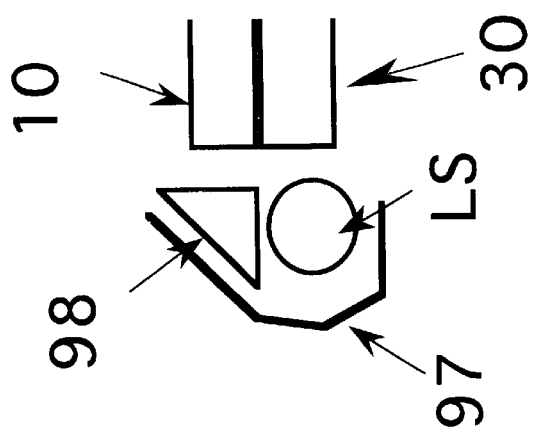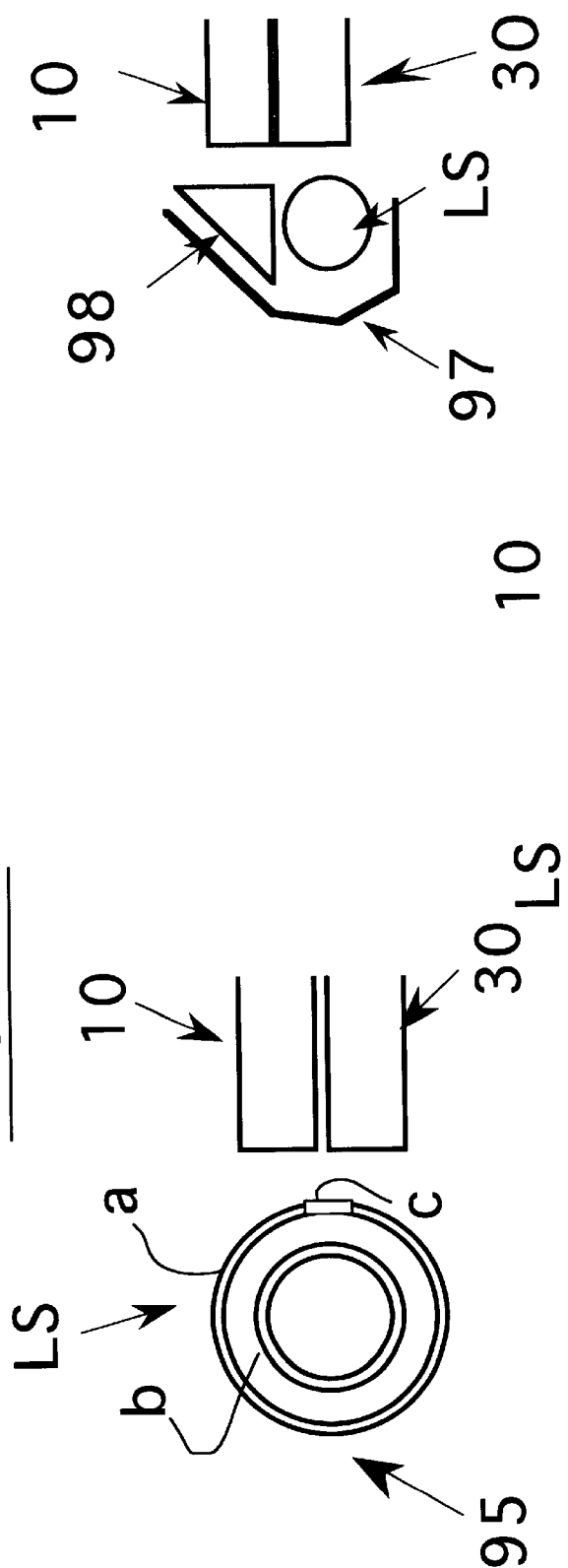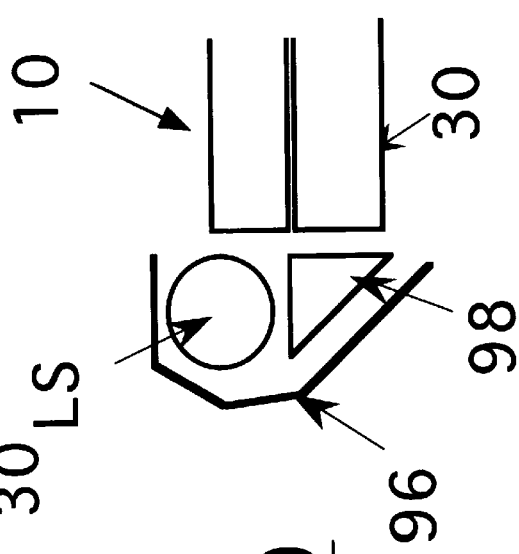

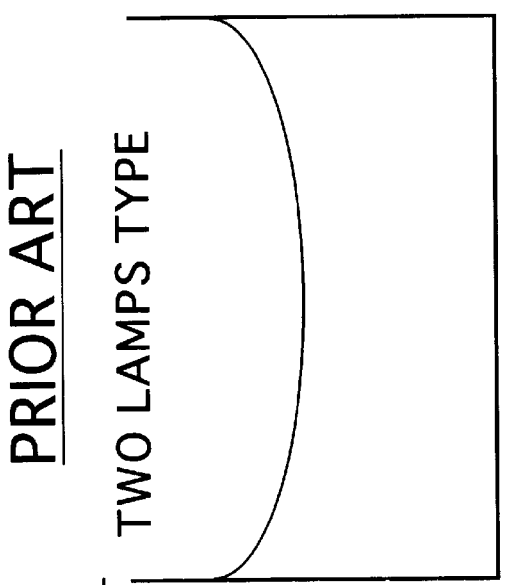

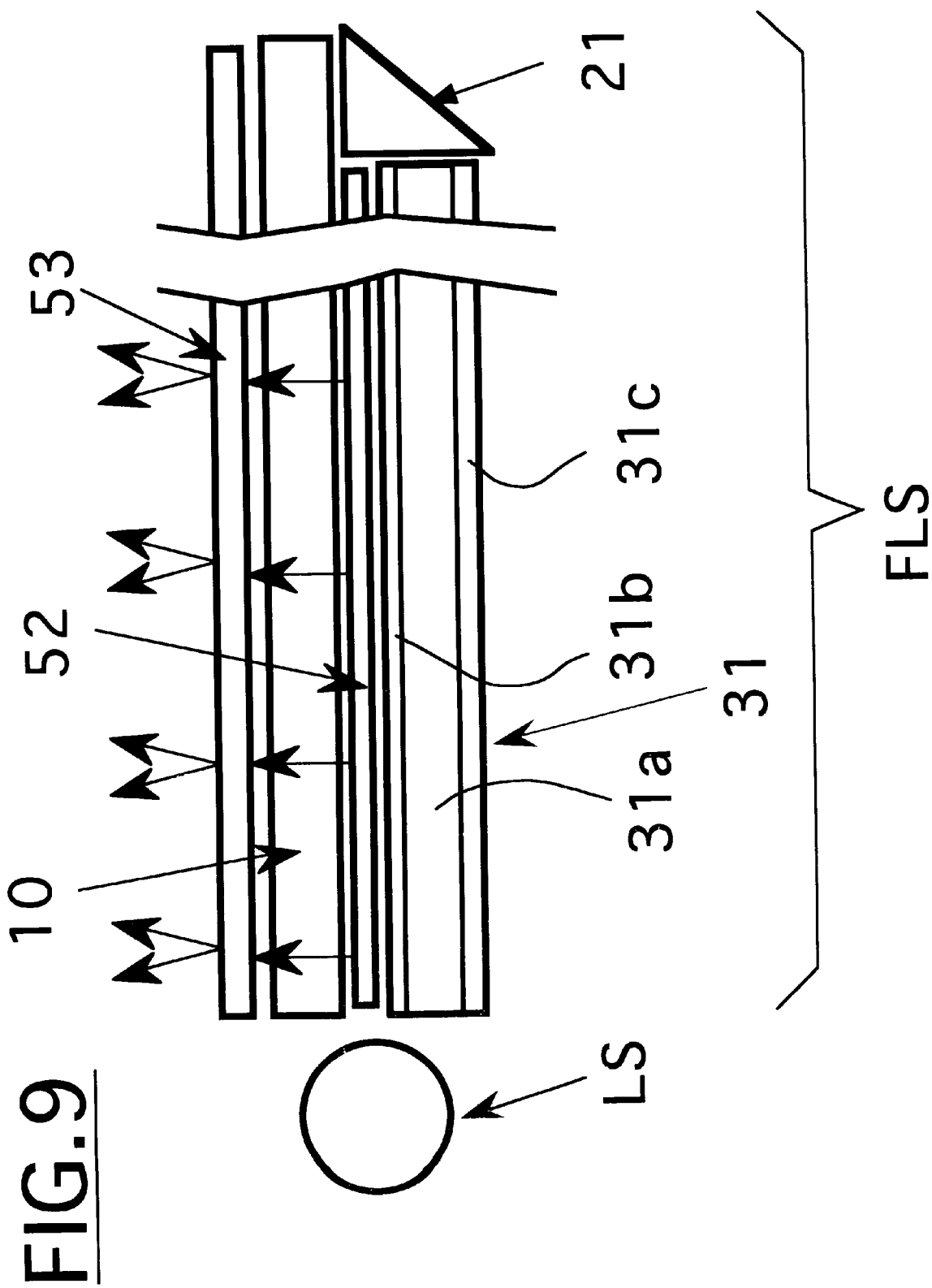

FLAT PANEL LIGHT SOURCE DEVICE AND PASSIVE DISPLAY DEVICE UTILIZING THE LIGHT SOURCE DEVICE

BACKGROUND OF INVENTION

1. TECHNICAL FIELD

This invention relates generally to flat type light source device, widely used for general lighting or illumination, or for back light illuminating passive type display device such as liquid crystal display device. More particularly, this invention relates to flat type light source device utilizing edge light effect in which multiple reflection of light rays are carried out between front and rear surfaces of the light transmission panel.

Furthermore, this invention generally relates to the passive type display devices with flat type light source device for use on back light illuminating the passive type display device and more particularly to the passive type display device providing the flat type light source device utilizing the edge light effect.

2. DESCRIPTION OF PRIOR ART

Liquid crystal displays are a typical example of passive type displays which do not emit light by themselves, different from active type displays which emit light by themselves such as CRT and electro-luminescence. Accordingly, the liquid crystal displays of transmissive type instead of reflective type are utilized in combination with the flat type light source or light transmission panel for back light which is located in rear of such display, so that it can be clearly observed by an observer in dark place as well as bright place.

In accordance with the prior art, such light transmission panel is widely used for the flat type light sources as back lights or film viewers to illuminate the passive type displays such as liquid crystal displays of transmissive type or the transparent picture film such as photographic films, by combination with light source such as fluorescent lamp of straight line type, located at side surface of said light transmission panel.

This type of lighting system is called as edge lighting or light transmission panel system, wherein the light transmission panel is made from transparent materials with high light transmission characteristics such as acrylic resin, polycarbonate resin or glass. Light rays emitted from light source are input to side surface of the light transmission panel. Such light rays repeat multiple reflection between front and rear surfaces in the light transmission panel. The light rays leak or output gradually according to transmission of light rays to illuminate an object such as the liquid crystal display or the picture film.

The light transmission panel is ordinarily of panel or film having rectangular illumination surface area substantially corresponding to that of the liquid crystal display.

The light transmission panel for illumination has rectangular surfaces with a pair of long sides and a pair of short sides. There are following four types of arrangement according to positioning between the light transmission panel and the line light source such as fluorescent lamp of straight line type;

(1) An arrangement of short side-one light type is such that one line light source is placed at a short side surface of the light transmission panel.

(2) An arrangement of long side-one light type is such that one line light source is placed at a long side surface of the light transmission panel.

(3) An arrangement of short side-two lights type is such that two line light sources are placed at two short side surfaces in the light transmission panel.

(4) An arrangement of long side-two lights type is such that two line light sources are placed at two long side surfaces in the light transmission panel.

As well known in this field, incident light rays into the light transmission panel for illumination are transmitted inside the light transmission panel and the light rays repeat multiple internal reflection from light incident side toward opposite side in the light transmission panel. Some amount of transmitted light rays reach until the opposite side in the light transmission panel. The rest of transmitted light rays leak little by little from surface of the light transmission panel for illumination to outside of the light transmission panel to illuminate the passive type display or the picture film.

Accordingly, in case of the short side-one light type or long side-one light type, brightness of surface projecting from surface of the light transmission panel is decreased extremely according to distance apart from location of the light source.

Such one light types can not obtain uniform surface brightness and have lower surface brightness according to distance apart from location of the light source.

In case the light transmission panel with large surface area is required for illumination, the one light types can not be used because distance to be transmitted is too long and brightness of surface is extremely low, near opposite side terminal far from light input side in the light transmission panel.

Therefore, the one light types are limited in usage for the liquid crystal displays of color indication type with small surface area or that of monochrome indication type not requiring relatively high and uniform surface brightness.

The two lights types are used for the liquid crystal displays of color and monochrome indication types with large surface area requiring relatively high and uniform surface brightness, such as monitors or displays for personal computers or television receivers.

Especially, movable electronic devices driven by battery power source having the liquid crystal display with back light require light weight or compact size, such as for personal computers and information & telecommunication terminals of note or handy size.

The two lights type using fluorescent lamps is not suitable for this purpose, because weight is almost double and housing space to accommodate lamps is almost double compared with one light type.

The fluorescent lamps decrease brightness and uniformity of emission at different surface spots on the lamp surface, because blackened area increases from electrodes toward center of the lamp according to a lapse of time, as known in fluorescent lamps for general lighting purpose. And blackened area is increasing according to a lapse of time and the blackened area differs by each different lamp.

Therefore, in two lights type using fluorescent lamps, uniformity is decreasing in brightness and displayed color at different spots on the surface of light transmission panel according to a lapse of time, compared with one light type.

SUMMARY OF THE INVENTION

An object of this invention is to provide a flat panel light source device, having uniform brightness of surface in a light transmission panel for illumination, utilizing an edge light effect.

A further object of this invention is to provide a passive type display device with a flat panel light source device, having uniform brightness of surface in a light transmission panel for illumination and to provide the passive type display device, utilizing the edge light effect.

According to one preferred embodiment of this invention, a flat panel light source device comprises a first and a second light transmission panels and a light coupling means. Both light transmission panels are located adjacently in parallel. The first light transmission panel is used for illumination. The second light transmission panel is used for bypass light guide. The light coupling means makes an optical coupling between the first and second light transmission panels. And the light coupling means is located near a pair of side terminals in the both light transmission panels distant from another pair of side terminals in the both panels.

According to another preferred embodiment of this invention, a passive type display device with flat panel light source comprises a flat panel type passive display device, such as liquid crystal display device, a flat panel light source, having a first and a second light transmission panels and a light coupling means. The flat panel light source is positioned in rear side of the passive type display device.

The first light transmission panel is used for illumination which have relatively high refractive index and relatively high light transmission characteristics, as same as used in the prior art, in which an edge light type lighting is applied. After light rays are projected from light source to side terminals in both light transmission panels, they are input into the side terminals in both light transmission panels. And the light rays are transmitted inside the both light transmission panels toward the opposite side terminal, by reflecting repeatedly between front surface and rear surface in the both light transmission panels.

In addition to the light transmission panels for illumination in the prior art, this embodiment uses an additional light transmission panel for bypass light guide which is comprised of relatively high refractive index and relatively high light transmission characteristics, as same as used in the light transmission panels for illumination. Both light transmission panels for illumination and for bypass light guide are located adjacently in parallel. Alight coupling means is provided to make an optical coupling between both light transmission panels. And the light coupling means is located near a pair of side terminals in the both light transmission panels distant from another pair of side terminals in the both panels, and incident light rays are input into the another pair of side terminals.

Therefore, only one common light source can project or input the light rays into a pair of side terminals in both light transmission panels for illumination and also for bypass light guide.

The incident light rays are transmitted inside first light transmission panel for illumination toward the opposite side terminal, by reflecting repeatedly between front surface and rear surface in the light transmission panel for illumination, some amount of the incident light rays leaks gradually from the surface of first light transmission panels and outputs to outside to illuminate an object such as passive type display or picture film.

On the other hand, in a preferred embodiment of this invention, almost incident light rays are transmitted effectively with minimum leakage of light rays, inside second light transmission panel for bypass light guide toward the opposite side terminal, by reflecting repeatedly between front surface and rear surface in the light transmission panel for bypass light guide, because the second light transmission panel has light reflective layer or layers in either or both of front and rear surfaces, of which light reflective layers is composed of light reflective material, or light transmission material with relatively low refractive index.

Such transmission light rays, which are bypassed and reached to opposite side terminal in the second light transmission panel, are input into opposite side terminal in the first light transmission panel, via the light coupling means by optical coupling in which direction of light rays changes to reverse by function of the light coupling means.

The transmission light rays, which are once bypassed and input inside the first light transmission panel for illumination, transmit from opposite side terminal in the first light transmission panel toward another side terminal near the light source in the first light transmission panel. By reflecting repeatedly between front surface and rear surface in the light transmission panel for illumination, some amount of the incident light rays leaks from the surface of first light transmission panels and outputs to outside to illuminate an object such as passive type display or picture film.

In a preferred embodiment of this invention, the second light transmission panel for bypass light guide has such function that almost incident light rays do not leak, different from the first light transmission panel for illumination.

Therefore this function is equivalent to as if an additional light source exists at the opposite side terminal, far from the another side terminal at which an actual light source exists.

BRIEF DESCRIPTION OF THE DRAWINGS

A complete understanding of this invention may be obtained from the following explanations, in connection with the accompanying drawings; in which:

"FIG. 5 is a schematic side elevational, partially omitted and cross-sectional view" is changed to "FIG. 5A, 5B, 5C, 5D and 5E are schematic side elevational, partially omitted and cross-sectional views". showing various light incident optical means to the first light transmission panel 10 for illumination and the second light transmission panel 30 for bypass light guide from light source (LS), according to the embodiment of this invention;

FIG. 6 is graphs showing distribution characteristics of brightness on the surface of first light transmission panel 10 according to the embodiment of the invention.

FIG. 7 is a graph showing distribution characteristics of brightness on the surface of light transmission panel in case one lamp source is used according to prior art.

FIG. 8 is a graph showing distribution characteristics of brightness on the surface of light transmission panel in case two lamps source are used according to prior art.

FIG. 9 is an enlarged side elevational, partially omitted and cross-sectional view of a flat panel type light source (FLS) according to another embodiment of this invention;

FIG. 15 is an enlarged side elevational, partially omitted and cross-sectional view, showing the light coupling means 24 and its neighborhood and also showing light transmission light passage way L5, according to another embodiment of this invention;

FIG. 16 is an enlarged side elevational, partially omitted and cross-sectional view, showing the light coupling means 24 and its neighborhood and also showing light transmission light passage way L6, according to an another embodiment of this invention;

FIG. 17 is an enlarged side elevational, partially

DESCRIPTION OF THE PREFERRED EMBODIMENTS

Figure 1:
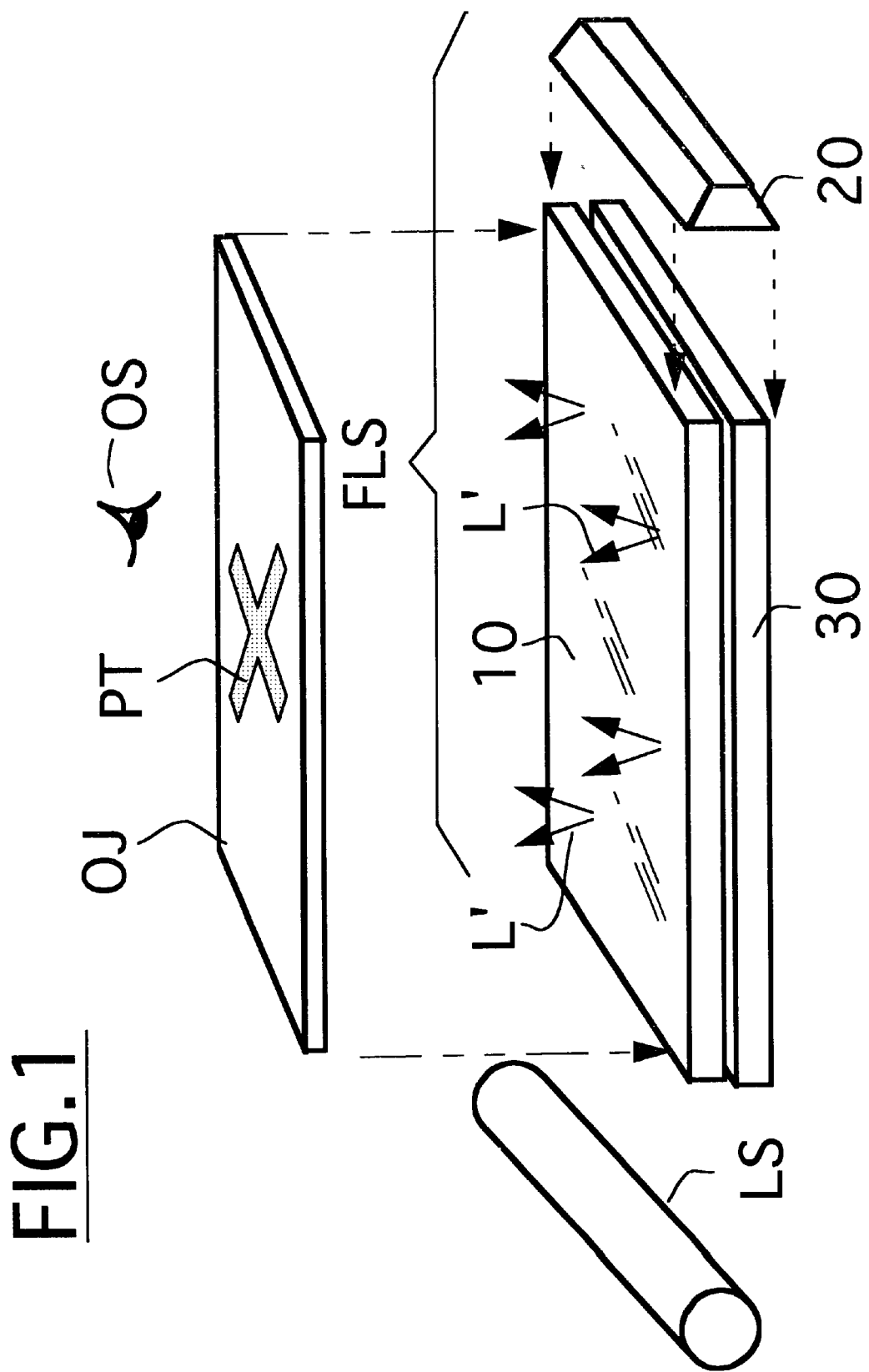
FIG. 1 is an exploded schematic perspective view of a flat panel type light source (FLS) to illuminate an object such as photographic film, liquid crystal display device according to one preferred embodiment of this invention.
Figure 2:
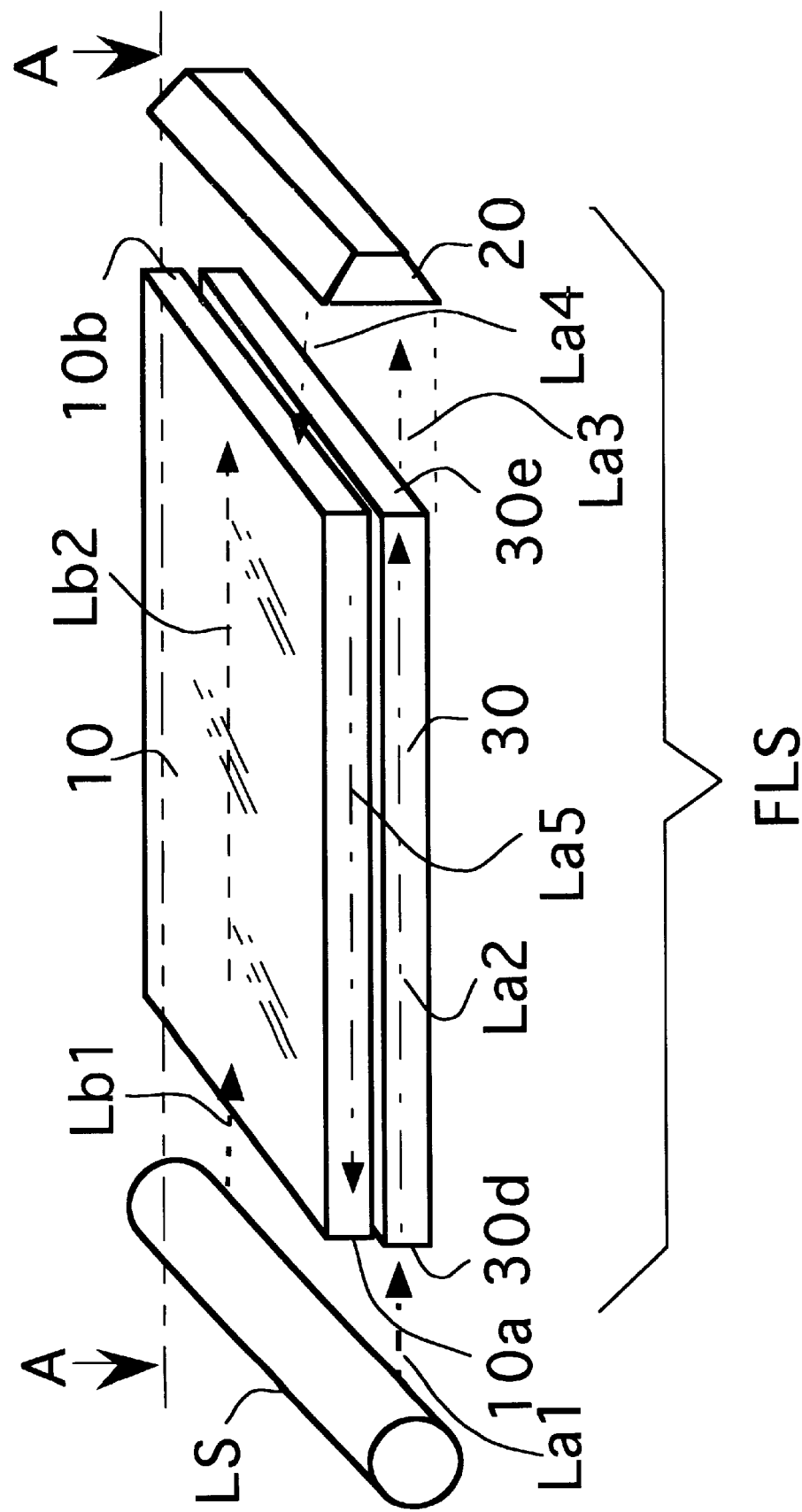
FIG. 2 is a schematic perspective view of a flat panel type light source (FLS) and also showing transmitting direction of light rays according to one preferred embodiment of this invention.
Figure 3:
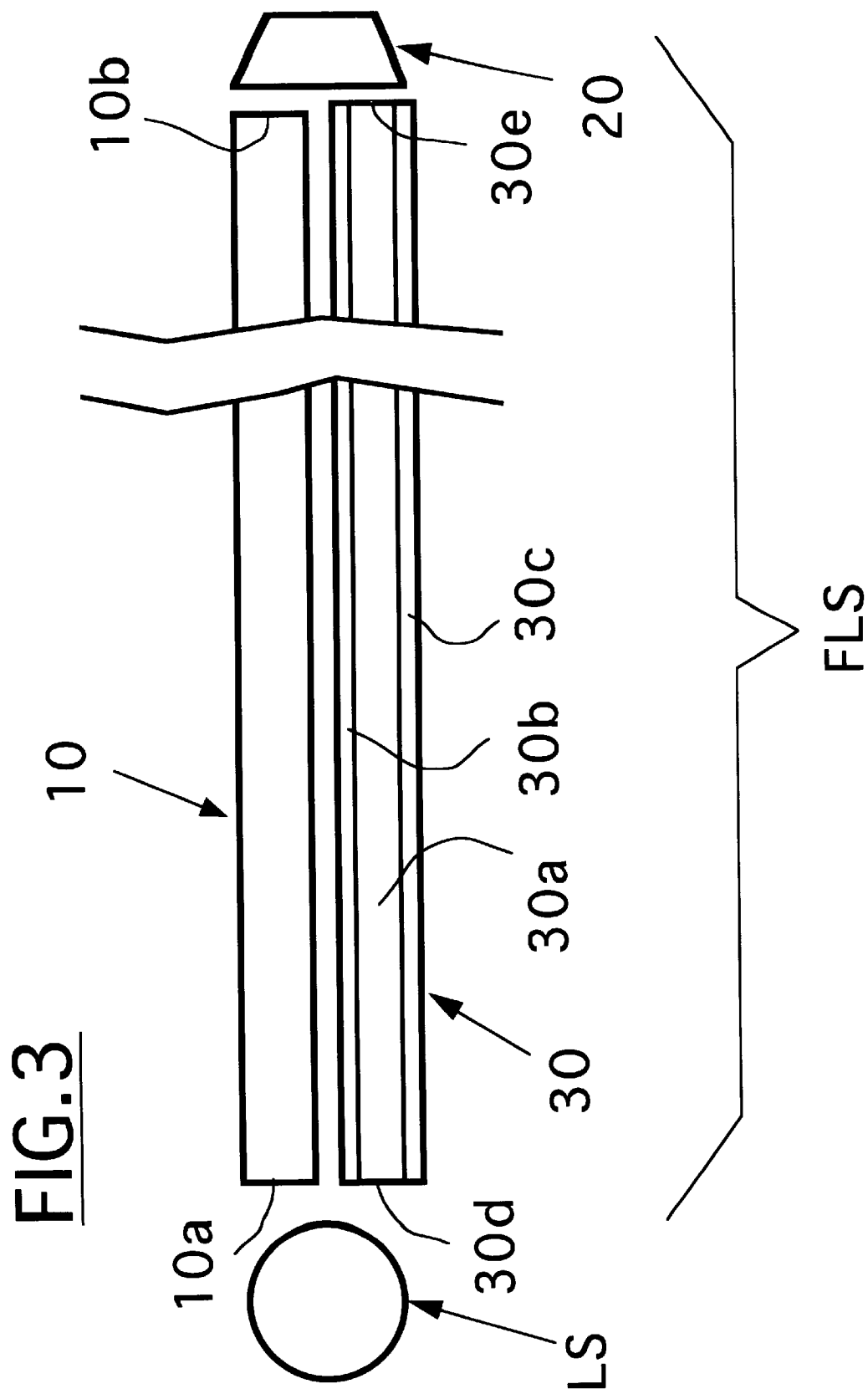
FIG. 3 is an enlarged side elevational, partially omitted and cross-sectional view of a flat panel type light source (FLS) taken along the line A—A of FIG. 2.
Figure 4:
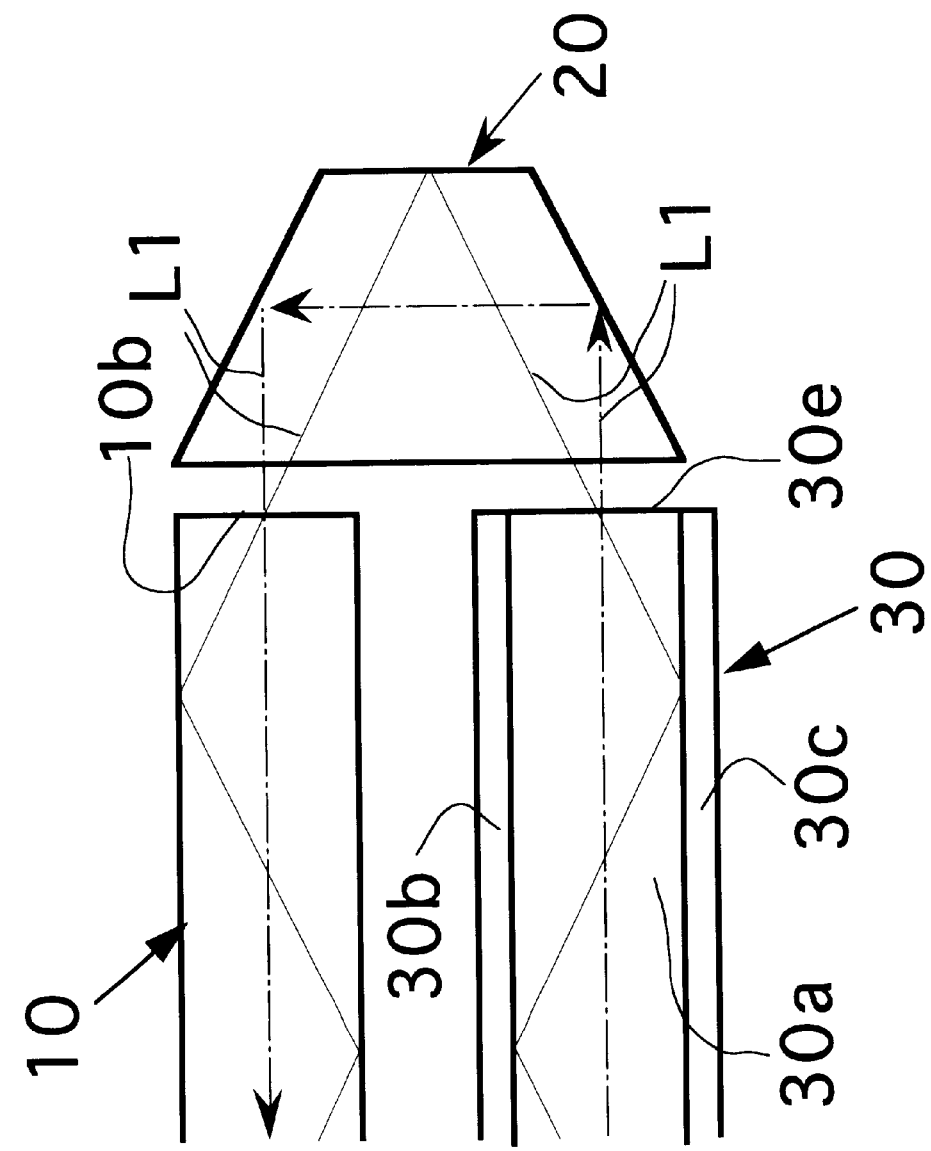
FIG. 4 is an enlarged side elevational, partially omitted and cross-sectional view, more enlarged than FIG. 2, showing the light coupling means 20 and its neighborhood in FIG. 3 and also showing light transmission passage way L1.

Reference is made to FIG. 1, FIG. 2, FIG. 3 and FIG. 4 showing one preferred embodiment of this invention. In which, FIG. 1 illustrates an exploded schematic perspective view of a flat panel type light source (FLS) to illuminate an object (OJ) such as photographic film, liquid crystal display device according to one preferred embodiment of this invention; FIG. 2 illustrates a schematic perspective view of a flat panel type light source (FLS) and also showing transmitting direction of light rays according to one preferred embodiment of this invention; FIG. 3 illustrates an enlarged side elevational, partially omitted and cross-sectional view of the flat panel type light source (FLS) in FIG. 2 taken along the line A—A; and FIG. 4 illustrates an enlarged side elevational view, more enlarged than FIG. 3, showing the light coupling means 20 and its neighborhood in FIG. 3.

In the drawing FIG. 1, briefly, a flat panel type light source (FLS) composes a first light transmission panel 10, a second light transmission panel 30 and a light coupling means 20. The first light transmission panel 10 is used for illumination and the second light transmission panel 30 is used for bypass light guide. The light coupling means 20 makes optically a light coupling between the first and second light transmission panels 10, 30. The first light transmission panel 10 emits or projects light rays L' from its surface. The first light transmission panel 10 illuminates a transmissive object (OJ) such as photographic film, liquid crystal display device. Therefore an observer OS can see pattern PT or visual information which is displayed on the object OJ even in dark place.

In the drawings FIG. 2, FIG. 3 and FIG. 4, the flat panel type light source FLS composes basically a first light transmission panel(or film)10, a second light transmission panel (or film) 30 and a light coupling means 20. The first light transmission panel 10 is located adjacently in parallel with the second light transmission panel 30. The light source LS is located near or adjacent to a pair of side terminals 10a, 30d in both light transmission panels 10, 30. The light coupling means 20 is located near or adjacent to another pair of side terminals 10b, 30e, distant from the pair of side-terminals 10a, 30d in both light transmission panels 10, 30, to which the incident light rays are input. Both of the light transmission panels 10, 30 have relatively high refractive index and relatively high light transmission characteristics. The first light transmission panel 10 is used for illumination and the second light transmission panel 30 is used for bypass light guide. The light coupling means 20 makes optically a light coupling between the first and second light transmission panels 10, 30. The second light transmission panel 30 has preferably light reflective layer or layers 30b and 30c or both of front and rear surfaces. The light reflective layers 30b, 30c are composed of light reflective material, or light transmission material with relatively low refractive index. For the light source LS, a straight line type light source may be used such as a tubular fluorescent lamp, tubular incandescent lamp, etc. The incident light rays La1, Lb2 projecting from the light source LS are input into the side terminal 10a and the side terminal 30d in the both panels 10, 30. The transparent materials with relatively high refractive index and relatively high light transmission characteristics may be used for the light transmission panels 10,30 and the light coupling means 20, such as transparent organic resin; acrylic resin or polymethyl methacrylate resin (PMMA), polycarbonate resin (PC), polystyrene (PS) resin, etc.; and transparent inorganic optical glass.

In a FIG. 2, transmitting direction of light rays is shown roughly. The light source LS generates light rays La1 and Lb1. A group of light rays "Lb1" are projected to the side terminal 10a of first panel 10, so indicated as dotted line with arrow mark to show transmitting direction of light rays Lb1. The light rays "Lb1" are input to the first panel 10 and become light rays "Lb2". The light rays Lb2 transmit inside the first panel 10 to direction of arrow mark. Another group of light rays "La1" are projected to the side terminal 30d of second panel 30, so indicated as dotted line with arrow mark to show transmitting direction of light rays La1. The incident light rays La1 into the second panel 30 become light rays La2. The light rays La2 transmit inside the second panel 30 to the another or opposite side terminal 30e, so indicated as dotted line with arrow mark to show transmitting direction of light rays La2. The light rays La2 are output from the opposite side terminal 30e of second panel 30 and become light rays La3. The light rays La3 are project into the light coupling means 20 in which transmitting direction is changed to reverse. Output light rays La4 from the light coupling means 20 are projected to the side terminal 10b of the first panel 10 and light rays La4 become light rays La5. The light rays La5 transmit inside the first panel 10 from the side terminal 10b to another side terminal 10a of the first panel 10.

It is necessary to transmit effectively the incident light rays from the side terminal 10a and 30d to the opposite side terminal 10b and 30e in the both panels 10, 30, by repeating multiple reflection between front and rear surfaces in the both panels 10, 30.

It must be noted that in the first light transmission panel 10, it is necessary for the light rays to output in suitable brightness and suitable distribution of brightness from the surface of the first light transmission panel 10 to outside, while in the second light transmission panel 30, it is necessary for the light rays not to output as much as possible to outside from the surface of the second light transmission panel 30.

Referring to FIG. 3 and FIG. 4, the light rays to be input into the first light panel 10 from the side terminal for light input 10a are transmitting toward the opposite side terminal 10b, and the transmitting light rays are output little by little to outside from the surface in the first light panel 10.

Referring to FIG. 4, after repeating multiple reflection in the second light transmission panel for bypass light guide 30, the light rays L1 in the second light panel 30 are output or projected from the opposite side terminal 30d in the second light panel 30 to the light coupling means 20. And the light rays L1 are received effectively at the light coupling means 20.

In this embodiment, the light coupling means 20 is indicated as pedestal shaped optical prism in which the light rays L1 change its direction by at least one time of internal reflection of light rays. After changing direction, the light rays L1 are output or projected from the light coupling means 20 to the opposite side terminal 10b in the first light transmission panels for illumination 10 and are received effectively at the opposite side terminal 10b. Next, the light rays L1 are transmitted to reverse direction repeating multiple reflection in the first light panel 10 toward the initial side terminal 10a in the first light panel 10.

The transmitting light rays leaks and outputs little by little from the surface of first light transmission panels for illumination 10.

The transparent materials with relatively high refractive index and relatively high light transmission characteristics may be used for the second light transmission panels for light guide 30, such as transparent organic resin and transparent inorganic optical glass, as the same as or similar to that of the first light transmission panels for illumination 10.

It is important factor for the second light transmission panel for light guide 30 to transmit light rays effectively repeating multiple reflection according to principle of "total reflection" in the optics with minimized leakage or with the least transmission loss of light rays from the one end of terminal 30d to the opposite end of terminal 30e. On the other hand, the first light transmission panel for illumination 10 must cause leakage of suitable amount of incident light rays outside the surfaces of the first light panel 10 to output light rays for illumination.

As indicated in FIG. 3 and FIG. 4, to obtain efficient light transmission with minimized leakage of light rays, the second light transmission panel for light guide 30 has both light reflective layers 30b, 30c on both surfaces in the second light panel 30. One type of the light reflective layers 30b, 30c has relatively low refractive index and relatively high light transmission characteristics, made from transparent material, such as silicone(SL) and fluoroethylene (FE). In this case, the second light panel 30 is equivalent to "core" with relatively high refractive index and equivalent to "cladding", "clad" or "sheath" with relatively high refractive index, in correspondence with technical terms explained for an optical fiber widely utilized in optical telecommunication. Another type of the light reflective layers 30b, 30c may be made from reflective metal, such as aluminum and nickel, to which light rays are reflected by mirror reflection. Alternatively, additional light reflective layers may be provided on other side surfaces ( not indicated in the drawings ), excluding the side surfaces 30d and 30e for light input and output respectively in the second light panel 30 to decrease loss of light leakage more. So, almost incident light rays are transmitted effectively with minimum leakage of light rays, inside the second light transmission panel 30 for bypass light guide toward the opposite side terminal 30e, by reflecting repeatedly between the front reflective layer 30b and the rear reflective layer 30c in the light transmission panel 30 for bypass light guide. After being output from the opposite side terminal 30e, the light rays L1 are input to the light coupling means 20 composed of pedestal shaped prism in this embodiment and they are reflected and change their direction inside the light coupling means 20. The light rays L1 changing direction are input from the opposite side terminal 10b into the first light transmission panel 10 for illumination and are transmitted by reflecting repeatedly toward the another side terminal 10a where the light source LS is located, and also the light rays L1 leak or output outside little by little, gradually and they L1 become outgoing or scattering light rays and next diffusing light rays.

In this preferred embodiment of this invention, the second light transmission panel for bypass light guide 30 has such function that almost incident light rays do not leak outside, different from the first light transmission panel for illumination 110. So this function is equivalent to such that an additional light source with similar characteristics exists to as if an actual light source exists also at the opposite side terminal 10b, far from the another side terminal 10a at which an actual light source exists. So, this embodiment of the invention can provide such flat panel light source FLS that has uniform brightness in almost whole area of the front surface for example with large size of the surface and light weight, by utilizing only one and common light source LS for both of the first and second light panels 10 and 30. While conventional flat panel light source in the prior art requires two light sources to obtain similar effect.

FIG. 4 is a schematic side elevational, partially omitted and cross-sectional view, showing various light incident optical means to the first light transmission panel 10 for illumination and the second light transmission panel 30 for bypass light guide from light source (LS), according to the embodiment of this invention.

In FIG. 5A, the light incident optical means comprises a tubular type fluorescent lamp LS and a reflector 94. The tubular type fluorescent lamp LS is located near one side terminal of the first light panel 10 and one side terminal of the second light panel 30. The reflector 94 is located in the rear of the tubular type fluorescent lamp LS. Conventional tubular type fluorescent lamp LS, cold cathode type or hot cathode type can be used for light source of the embodiment. This fluorescent lamp LS includes a glass tube "a" and phosphor layer "b", in which the phosphor layer "b" is coated on all inner surface of the glass tube "a". Light rays generating from the fluorescent lamp LS are projected directly or reflecting in the reflector 94 to the side terminals of the first and second light panels 10, 30.

In FIG. 5B, the light incident optical means comprises a tubular type fluorescent lamp LS, a reflector 94 located in the rear of the lamp LS and a light collector 92. The light collector 92 is located between the lamp LS and the side terminals of both panels 10, 30. The light collector 92 is made from light transmission material of relatively high refractive index with pedestal shape in cross section. Light rays generating from the fluorescent lamp LS are projected to the side terminals of the first and second light panels 10, 30 through the light collector 92 by which light rays are effectively collected and focused to both side terminals of the first and second panels 10, 30.

In FIG. 5C, the light incident optical means comprises an aperture type fluorescent lamp LS with reflector 95. This fluorescent lamp LS includes a glass tube "a", phosphor layer "b", the reflector 95 and an aperture or opening "c". The phosphor layer "b" is coated on all inner surface of the glass tube "a". The reflector 95 or reflecting metal coating such as aluminum is coated on outer surface of the glass tube "a", without the aperture "c" in which the reflecting coating is omitted. Light rays generating from the aperture type fluorescent lamp LS are projected from the aperture "c" directly or reflecting in the reflector 95 to both side terminals of the first and second light panels 10, 30.

In FIG. 5D, the light incident optical means comprises a tubular type fluorescent lamp LS, an optical prism 98 of triangular shape in cross section and a reflector 95. The lamp LS is located near one side terminal of the first light transmission panel 10. The optical prism 98 is located near one side terminal of the second light transmission panel 30. Light rays generating from the lamp LS are projected to one side terminals of the first light panel 10 and a surface of the prism 98. Light rays input inside the prism 98 changes their direction and output from another surface of the prism 98 to project one side terminals of the second light panel 30.

In FIG. 5E, the light incident optical means comprises a tubular type fluorescent lamp LS, an optical prism 98 and a reflector 98, similar to that shown in FIG. 5D, except that the lamp LS and an optical prism 98 turn reversely in their position.

FIG. 6 is a graphs showing distribution characteristics of brightness on the surface of first light transmission panel 10 according to the embodiment of the invention.

FIG. 7 is a graph showing distribution characteristics of brightness on the surface of first light transmission panel 10 in case one lamp source is used according to a prior art.

FIG. 8 is a graph showing distribution characteristics of brightness on the surface of first light transmission panel 10 in case two lamps source are used according to another prior art.

In FIG. 6, FIG. 7 and FIG. 8, on the surface of first light transmission panel 10.

In the embodiment of the invention as shown in FIG. 5, brightness on the surface of first light transmission panel 10 is relatively uniform characteristics in any spots on surface of first light transmission panel 10 between one side terminal 10a and opposite side terminal 10b, in spite of using only one light source LS.

On the contrary, in a prior art in case of using only one light source as shown in FIG. 6, brightness on the surface of first light transmission panel 10 is not uniform characteristics in any spots on surface of first light transmission panel 10 between one side terminal 10a and opposite side terminal 10b.

In this case the brightness is greatly decreased according to position on surface of first light transmission panel 10.

In another prior art in case of using two light sources as shown in FIG. 8, brightness on the surface of first light transmission panel 10 is uniform characteristics in any spots on surface of first light transmission panel 10 between one side terminal 10a and opposite side terminal 10b, similar to the embodiment of the invention. But the prior art requires two light sources, while the embodiment requires only one light source to get similar uniform characteristics of brightness.

Figure 10:
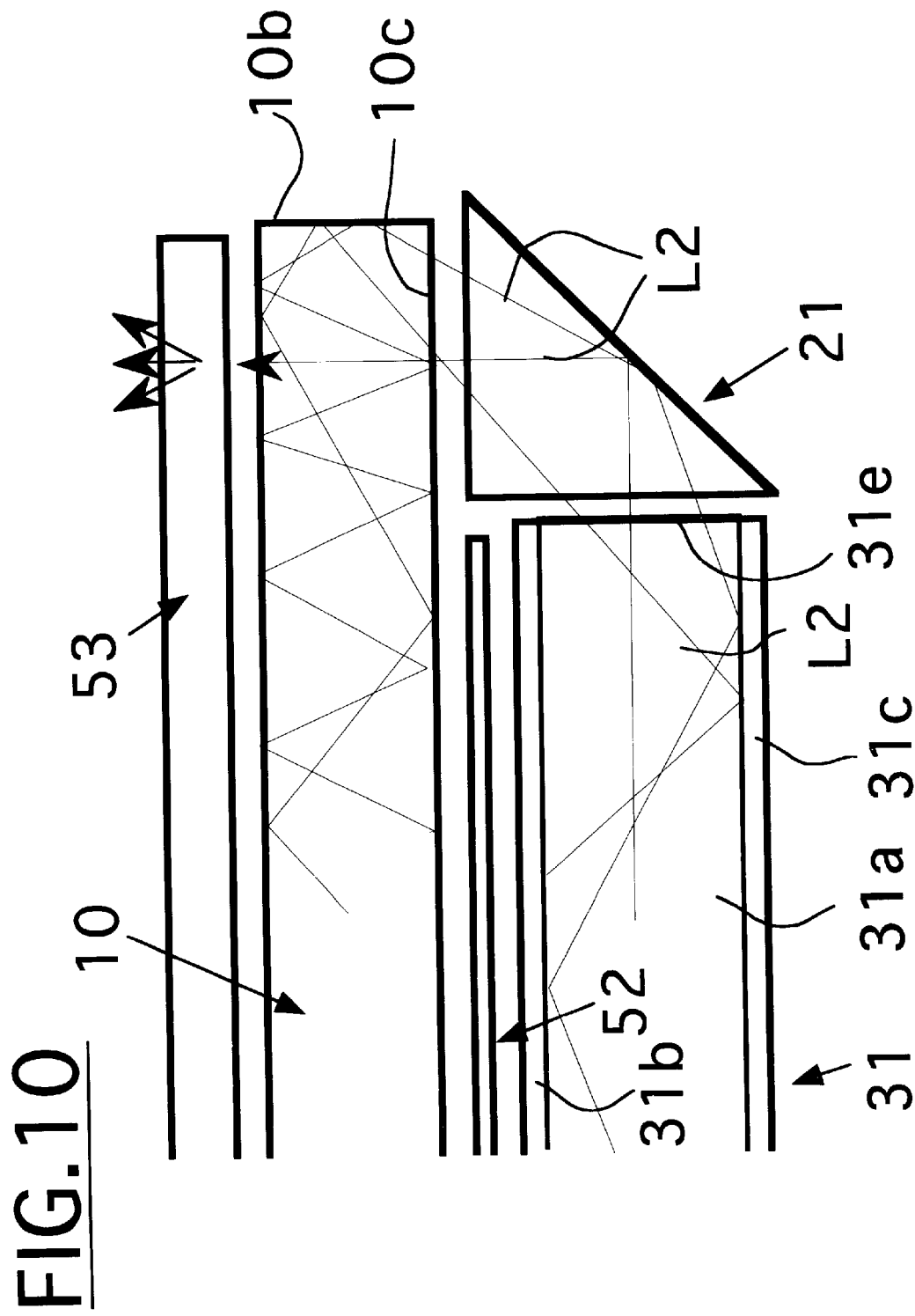
FIG. 10 is an enlarged side elevational, partially omitted and cross-sectional view, more enlarged than FIG. 9, showing the light coupling means 21 and its neighborhood in FIG. 9 and also showing light transmission passage way L2.

Referring to FIG. 9 and FIG. 10, other embodiments of the invention are explained.

FIG. 9 is an enlarged side elevational, partially omitted, cross-sectional view, showing another flat panel type light source FLS2 embodying this invention.

FIG. 10 is an enlarged side elevational, partially omitted, cross-sectional view, more enlarged than FIG. 9, showing the light coupling means 21 and its neighborhood in FIG. 8 and also showing light transmission light passage way L2.

This embodiment is similar to and in common with the first embodiment explained before, except that a light coupling means 21 and its location are different from the first embodiment. So, common explanation with the first embodiment is omitted as much as possible, so that explanation is simplified.

In FIG. 9 and FIG. 10, a flat type light source F L S 2 of this embodiment comprises the second light transmission panel for bypass light guide 31, the first light transmission panel for illumination 10, the light scattering panel 52 and the light diffusing panel 53, in which they are positioned in this order from bottom to top and located adjacently each other. As same as the first embodiment, a straight line type of light source LS such as a tubular fluorescent lamp is located near the side terminal 10a of the light transmission panels 10 and the side terminal 31d of the light transmission panels 31. Incident light rays projecting from the light source LS are input into the side terminal 10a and the side terminal 31d in the both panels 10, 31. In this embodiment different from the first one, the second light transmission panels 31 is so designed to be shorter than the first light transmission panels 10. Namely, opposite side terminal 31e in the second light transmission panels 30 is designed to end in shorter position than opposite side terminal 10b in the first light transmission panels 10. In this embodiment, a column prism with triangular section is used for a light coupling means 21 different from the first embodiment. A side of the triangular prism 21 is adjacently positioned at opposite side terminal 31e in the second light transmission panels 31. Another side of the triangular prism 21 is adjacently positioned at a part 10c of rear surface near opposite side terminal 10b in the first light transmission panels 10. Therefore, almost incident light rays in core portion 31a of the second light transmission panel 31 for bypass light guide are transmitted effectively with minimum leakage of light rays toward the opposite side terminal 31e, by reflecting repeatedly between a cladding portion 31b and another cladding portion 31c in the light transmission panel 31 for bypass light guide. After the light rays L2 is output from a part 10c of rear surface near opposite side terminal 10b in the first light transmission panels 10, the light rays L2 are input to the triangular prism 21 and they are reflected and change their direction inside the triangular prism 21. The light rays L2 changing direction are input from a part 10c of the rear surface in the first light transmission panel 10 for illumination and are transmitted by reflecting repeatedly toward the another side terminal 10a where the light source is located, and also the light rays L2 leak or output outside little by little gradually and they L2 become outgoing light La (or scattering light) and diffused light Lb.

In this embodiment, because the triangular prism 21 for light coupling means can be suitably accommodated in rear of the first light transmission panel 10 as shown in FIG. 9 & 10 without extending to right side in the drawings, the flat panel light source FPL can have effective lighting surface of larger area including light coupling means.

Figure 11:
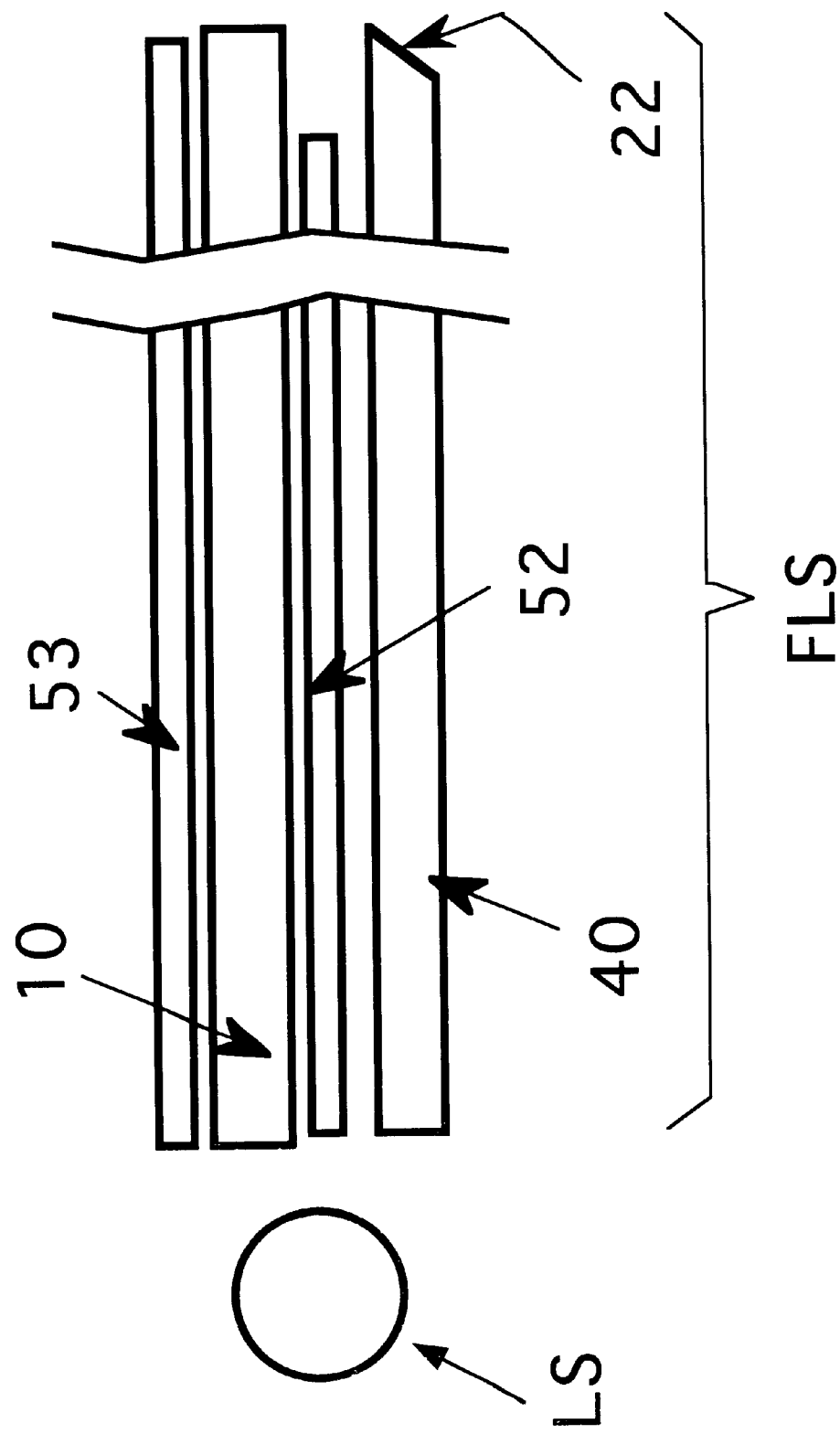
FIG. 11 is an enlarged side elevational, partially omitted and cross-sectional view, showing a flat panel type light source according to a further embodiment of this invention.
Figure 12:
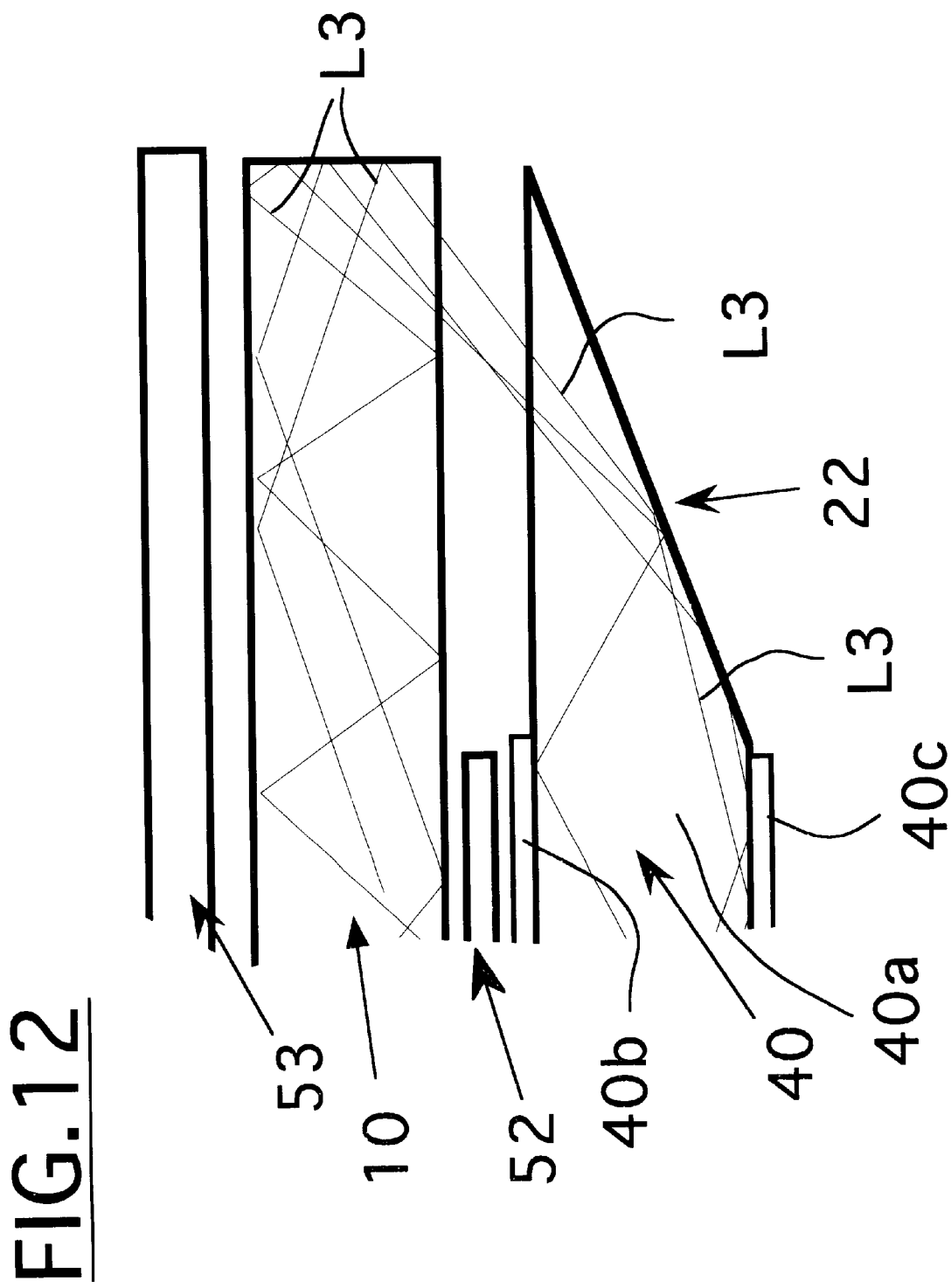
FIG. 12 is an enlarged side elevational, partially omitted and cross-sectional view, more enlarged than FIG. 11, showing the light coupling means 22 and its neighborhood in FIG. 9 and also showing light transmission passage way L3.

FIG. 11 and FIG. 12 illustrate a further embodiment of the invention. FIG. 11 is an enlarged side elevational cross-sectional view, showing a further flat panel type light source embodying this invention. FIG. 12 is an enlarged side elevational partial view more enlarged than FIG. 11, showing mainly another light coupling means 22 in FIG. 11 and also showing light transmission light passage way L3.

Common explanation with the first and another embodiment is omitted as much as possible, Therefore that simplification of explanation can be obtained.

In FIG. 11 and FIG. 12, a further flat type light source includes other second light transmission panel 40 for bypass light guide in which the panel 40 is composed of flat panel portion with two parallel surfaces in major part and of taper panel portion with an inclined surface in rest part. In this embodiment, the taper panel portion functions equally to the light coupling means 22. Almost incident light rays in core portion 40a or the second light transmission panel 40 for bypass light guide are transmitted effectively with minimum leakage of light rays to the taper shaped light coupling means 22, by reflecting repeatedly between a cladding portion 40b and another cladding portion 40c.

In FIG. 12, the light transmission light rays L3 output from a flat front surface at taper shaped portion near opposite side terminal in the second light transmission panels 40 and input into a corresponding rear surface in the first light transmission panels 10 to the above mentioned taper shaped portion. Then, the light transmission light rays L3 which are changed their direction repeat multiple light reflection toward the initial incident terminal in which the light source LS is located in the first light transmission panel 10 and leaks gradually from the surface in the first panel 10 and become output light rays La and Lb.

In this embodiment, because the second light transmission panel 40 has the taper panel portion 22 for light coupling means, an additional light coupling means can be eliminated. Furthermore the taper panel portion 22 can be suitably accommodated in rear of the first light transmission panel 10, as shown in FIG. 11 & 12 without extending to right side in the drawings, the flat panel light source LPL can have effective lighting surface of larger area including light coupling means 22.

Figure 13:
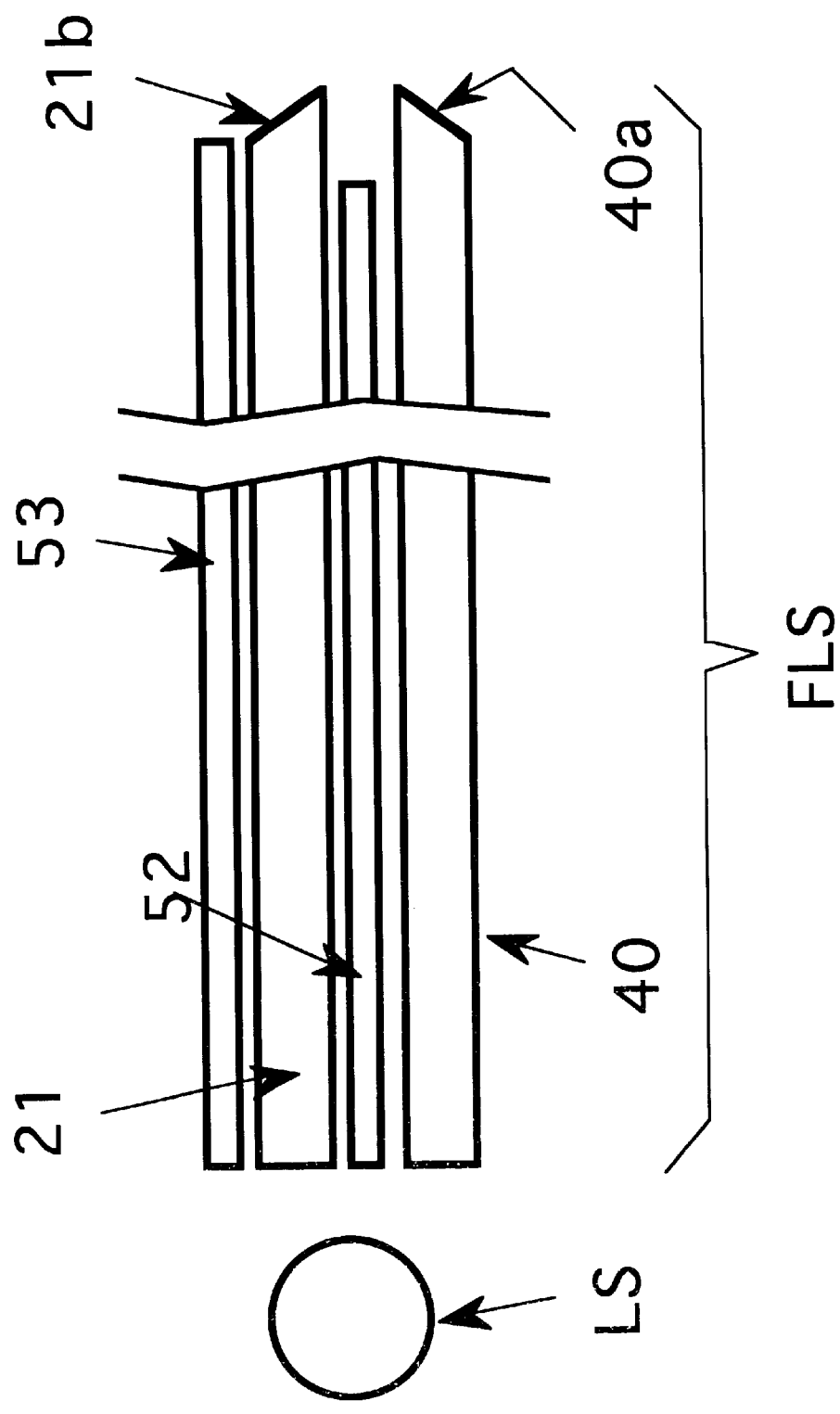
FIG. 13 is an enlarged side elevational, partially omitted and cross-sectional view, showing a flat panel type light source according to a still another embodiment of this invention.

FIG. 13 is an enlarged side elevational cross-sectional view, showing a still further flat panel type light source embodying this invention.

Figure 14:
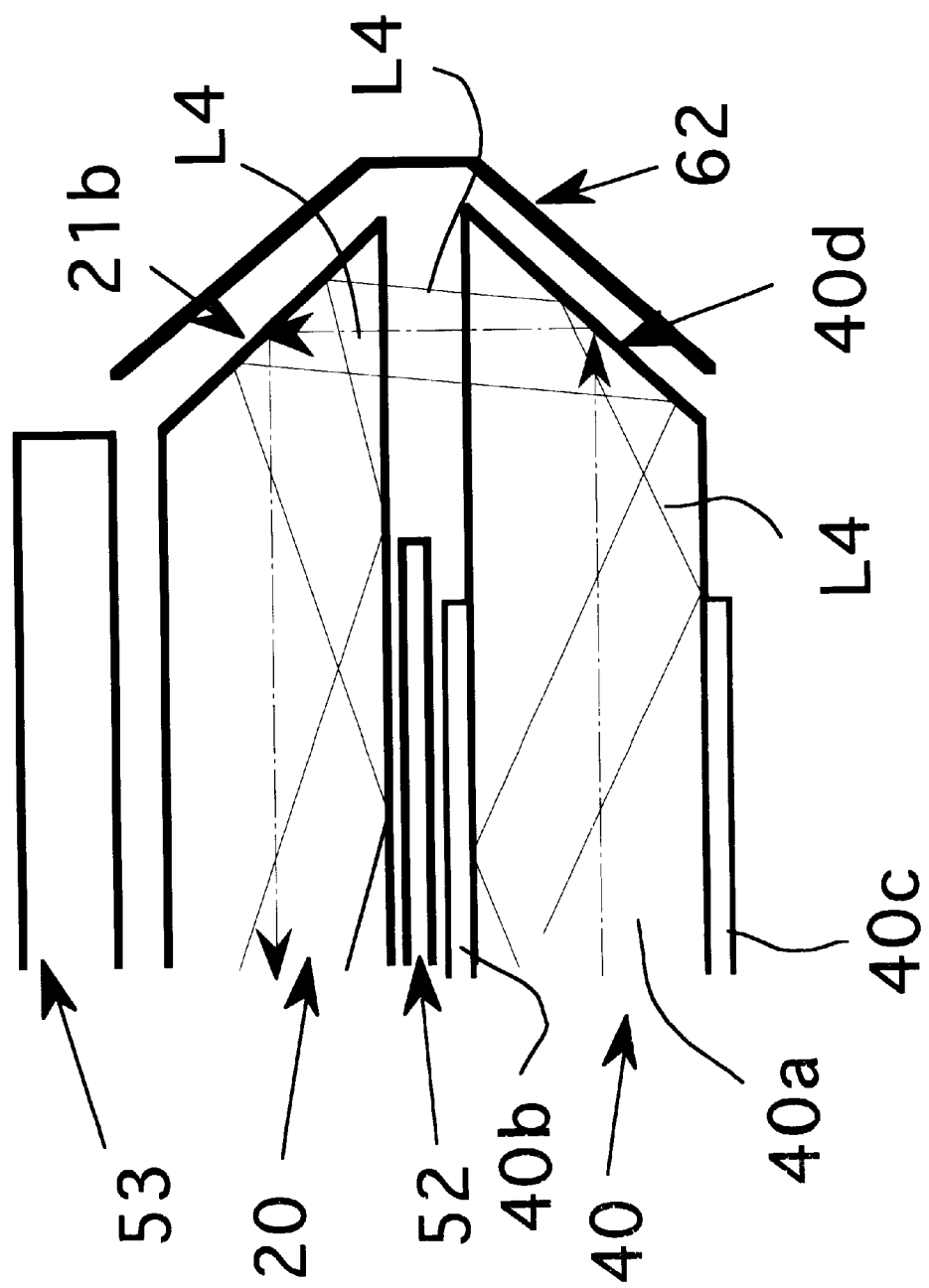
FIG. 14 is an enlarged side elevational, partially omitted and cross-sectional view, more enlarged than FIG. 13, showing the light coupling means 21b and 40d and its neighborhood in FIG. 13 and also showing light transmission light passage way L4.

FIG. 14 is an enlarged side elevational partial view more enlarged than FIG. 13, showing mainly another light coupling means 23a, 23b in FIG. 13 and also showing light transmission light passage way L4.

This embodiment is similar in major portion to the first embodiment, while light coupling portion 23a 23b and the location are different from the first embodiment. Therefore, common explanation with the above mentioned embodiment is omitted as much as possible, so that simplification of explanation can be obtained.

As illustrated in FIG. 13 and FIG. 14, a still further flat type light source FLS includes the first and second light transmission panels 21 and 40 in which the panels 21 and 40 are composed of flat panel portion with two parallel surfaces in major part and of a taper panel portion with an inclined surface in rest part, respectively. In this embodiment, a pair of taper panel portions in both panels 21 and 40 corporate to function equally to the light coupling means 21b, 40d. A light reflector 62 in FIG. 14 has shape rotating a character "V" by 90 degree to anti-clock wise. The light reflector 62 helps the light rays leaked from right side of a taper shaped light coupling means 21b to input into another taper shaped light coupling means 23b and also helps the light rays leaked from another taper shaped light coupling means 23b to outside to reflect and feedback into the taper shaped light coupling means 23b.

Referring to FIG. 15, FIG. 16, FIG. 17, FIG. 18 and FIG. 19, various modifications to light coupling means are explained as follows.

In FIG. 15, the first light transmission panel 10 and the second light transmission panel 40 are arranged adjacently in parallel and two opposite terminal sides of the both panels 10 and 30 are aligned in one line. In this modification, a light coupling means 24 is composed of rectangular parallel column of light transmission material and positioned between both terminal sides in both panels 10 and 30. A reflector 63 of modified "V" shape is positioned near the reflector 63 to reflect effectively leaked light rays outside.

In this modification, the second light transmission panel 30 for bypass light guide eliminates cladding layers on the both surfaces of the core, but uses air with lower refractive index than that of the second panel 30 as cladding in stead of the cladding layers.

In FIG. 15, almost light rays incident to the second light transmission panel 30 for bypass light guide are transmitted effectively with minimum leakage of light trays to the opposite terminal side, by reflecting repeatedly between both surfaces of the panel 30, by presence of air with lower refractive index than that of the panel 30. Next, some amount of light rays L5 output from the opposite terminal side and input to the rectangular parallel column 24. This incident light rays L5 is reflected inside the In FIG. 24, the second light transmission panel for bypass light guide 68 is composed of multiple of optical fibers 68a and supporting panel 68b. The optical fibers 68a are aligned in a line and fixed on the supporting panel 68b by coating of adhesives. Each optical fiber 68a is consisting of CORE with high refractive index and SHEATH with low refractive index.

While certain preferred embodiments of the present invention have been disclosed in detail, it is to be understood that various modifications and changes may be made without departing from the spirit of the invention or the scope of the following claims.

What is claimed is:

1. Flat panel light source device comprising:
   (a) First and second light transmission panels, with relatively high refractive index and relatively high light transmission characteristics, being located adjacently in parallel, said first light transmission panel being for use for illumination and said second light transmission panel being for use a bypass light guide; and
   (b) light coupling means, making light coupling between said first and second light transmission panels, said light coupling means being located near one pair of side terminals of said both light transmission panels distant from another pair of side terminals of said both light transmission panels, incident light rays being input into said another pair of side terminals, wherein said light coupling means is an optical prism.

2. Flat panel light source device, according to claim 1; wherein a light source of line light type is provided to project light rays to said another pair of side terminals of said both light transmission panels.

3. Flat panel light source device, according to claim 1; wherein said second light transmission panel has a front, rear, and side surfaces, wherein at least one of said second transmission panel front, rear and side surfaces has a light reflective layer or a plurality of light reflective layers.

4. Flat panel light source device, according to claim 3; wherein said second light transmission panel has at least one of light reflective layer composed of light transmission material with lower refractive index than said second light transmission panel.

5. Flat panel light source device, according to claim 3; wherein said second light transmission panel has at least one of light reflective layer composed of reflective metal.

6. Flat panel light source device, according to claim 1; wherein a pair of both terminal surfaces of said both light transmission panels are projected by light rays generating from a light source.

7. Flat panel light source device comprising:
(a) first light transmission panel being for use for illumination only, with relatively high refractive index and relatively high light transmission characteristics, wherein incident light rays being input from one side terminal are leaked little by little from front surface and/or rear surface of said first light transmission panel to outside;
(b) second light transmission panel for use as bypass light guide only, with relatively high refractive index and relatively high light transmission characteristics, being located adjacently in parallel with said first light transmission panel, wherein said second light transmission panel has first light reflective layer on front surface and second light reflective layer on rear surface, so that almost all incident light rays being input from one side terminal are transmitted effectively with minimum leakage of said light rays to opposite side terminal by reflecting repeatedly between said second light transmission panel front surface and said second light transmission panel rear surface; and
(c) light coupling means, making light coupling between said first and second light transmission panels, near one pair of terminal side surfaces of said both light transmission panels, wherein said light rays being output from second light transmission panel are changed in direction and are input into said first light transmission panel.

8. Flat panel light source device, according to claim 7; wherein one common light source of line light type is provided to project incident light rays for input to of terminal side surfaces of said both light transmission panels.

9. Flat panel light source device, according to claim 7; wherein said light reflective layers are composed of reflective metal.

10. Flat panel light source device, according to claim 7; wherein said light reflective layers are composed of transparent material with lower refractive index than said refractive index of said second light transmission panel.

11. Flat panel light source device, according to claim 7; wherein a pair of both terminal side surfaces of said both light transmission panels are projected by light rays generating from light source.

12. Flat panel light source device comprising:
(a) first light transmission panel being for use for illumination only, with relatively high refractive index and relatively high light transmission characteristics, wherein incident light rays being input from one side terminal are leaked little by little from front surface and/or rear surface of said first light transmission panel to outside;
(b) second light transmission panel for use as bypass light guide only, with relatively high refractive index and relatively high light transmission characteristics, being located adjacently in parallel with said first light transmission panel, wherein said second light transmission panel has first light reflective layer on front surface and second light reflective layer on rear surface, so that almost all incident light rays being input from one side terminal are transmitted effectively with minimum leakage of said light rays to opposite side terminal by reflecting repeatedly between said second light transmission panel front surface and said second light transmission panel rear surface; and
(c) light coupling means, composed of a transparent optical component, making light coupling between said first and second light transmission panels, near one pair of terminal side surfaces of said both light transmission panels, wherein said light rays being output from second light transmission panel are changed in direction and are input into said first light transmission panel.

13. Flat panel light source device, according to claim 12; wherein said transparent optical component is composed of transparent organic resin.

14. Flat panel light source device, according to claim 12; wherein said transparent optical component is composed of transparent inorganic optical glass.

15. Flat panel light source device, according to claim 12; wherein said transparent optical component is an optical prism.

16. Flat panel light source device, according to claim 15; wherein said optical prism is pedestal shaped.

17. Flat panel light source device, according to claim 12; wherein one common light source of line light type is provided to project incident light rays for input to terminal side surfaces of said both light transmission panels.

18. Flat panel light source device, according to claim 12; wherein said light reflective layers are composed of reflective metal.

19. Flat panel light source device, according to claim 12; wherein said light reflective layers are composed of transparent material with lower refractive index than said refractive index of said second light transmission panel.

20. Flat panel light source device, according to claim 12; wherein a pair of both terminal side surfaces of said both light transmission panels are projected by light rays generating from light source.

21. Passive display device comprising:
(a) a flat panel type passive display device;
(b) first light transmission panel being for use for illumination only, with relatively high refractive index and relatively high light transmission characteristics, wherein incident light rays being input from one side terminal are leaked little by little from front surface and/or rear surface of said first light transmission panel to outside;
(c) second light transmission panel for use as bypass light guide only, with relatively high refractive index and relatively high light transmission characteristics, being located adjacently in parallel with said first light transmission panel, wherein said second light transmission panel has first light reflective layer on front surface and second light reflective layer on rear surface, so that almost all incident light rays being input from one side terminal are transmitted effectively with minimum leakage of said light rays to opposite side terminal by reflecting repeatedly between said second light transmission panel front surface and said second light transmission panel rear surface; and
(d) light coupling means, making light coupling between said first and second light transmission panels, near one pair of terminal side surfaces of said both light transmission panels, wherein said light rays being output from second light transmission panel are changed in direction and are input into said first light transmission panel.

* * * * *